United States Patent
Doorhy et al.

(10) Patent No.: US 9,128,778 B2
(45) Date of Patent: Sep. 8, 2015

(54) SYSTEM AND METHOD FOR ASSIGNMENT OF VIRTUAL MACHINES BASED ON PHYSICAL INFORMATION

(75) Inventors: Brendan F. Doorhy, Westmont, IL (US); Shahriar B. Allen, Naperville, IL (US); Sambodhi Chatterjee, Naperville, IL (US); Guy M. Panozzo, Tinley Park, IL (US); Jasleen Sahi, Schererville, IN (US); Carl M. Trotto, Palos Hills, IL (US)

(73) Assignee: Panduit Corp., Tinley Park, IL (US)

( * ) Notice: Subject to any disclaimer, the term of this patent is extended or adjusted under 35 U.S.C. 154(b) by 506 days.

(21) Appl. No.: 13/331,344

(22) Filed: Dec. 20, 2011

(65) Prior Publication Data

US 2012/0191857 A1    Jul. 26, 2012

Related U.S. Application Data

(60) Provisional application No. 61/428,315, filed on Dec. 30, 2010.

(51) Int. Cl.
*G06F 15/173* (2006.01)
*G06F 9/50* (2006.01)

(52) U.S. Cl.
CPC ............. *G06F 9/5094* (2013.01); *Y02B 60/142* (2013.01); *Y02B 60/16* (2013.01)

(58) Field of Classification Search
CPC ............... H04L 29/08153; H04L 29/08225; H04L 67/1004; H04L 67/1023; G06F 9/5094; Y02B 60/142; Y02B 60/162
USPC .................... 709/219, 226, 229, 240
See application file for complete search history.

(56) References Cited

U.S. PATENT DOCUMENTS

| | | | |
|---|---|---|---|
| 7,693,959 B2* | 4/2010 | Leighton et al. | 709/217 |
| 7,725,558 B2* | 5/2010 | Dickenson | 709/215 |
| 8,099,487 B1* | 1/2012 | Smirnov et al. | 709/223 |
| 8,386,610 B2* | 2/2013 | Yahalom et al. | 709/226 |
| 8,396,956 B2* | 3/2013 | Thomson et al. | 709/223 |
| 2004/0019609 A1 | 1/2004 | Orton, III et al. | |
| 2004/0098490 A1* | 5/2004 | Dinker et al. | 709/229 |
| 2005/0228618 A1* | 10/2005 | Patel et al. | 702/188 |
| 2006/0259622 A1* | 11/2006 | Moore et al. | 709/226 |
| 2007/0222597 A1 | 9/2007 | Tourrilhes et al. | |
| 2007/0239569 A1 | 10/2007 | Lucas et al. | |
| 2007/0250410 A1 | 10/2007 | Brignone et al. | |
| 2007/0250631 A1* | 10/2007 | Bali et al. | 709/226 |

(Continued)

OTHER PUBLICATIONS

Cullen Bash, et al., "Cool Job Allocation: Measuring the Power Savings of Placing Jobs at Cooling-Efficient Locations in the Data Center"; Proceedings of the USENIC Annual Technical Confererence; Jun. 22, 2007; 10 pages.

(Continued)

*Primary Examiner* — Jonathan Bui
(74) *Attorney, Agent, or Firm* — Christopher S. Clancy; Yuri Astvatsaturov

(57) ABSTRACT

A system balances computational loads, for example in a virtual machine environment, taking into account the physical characteristics of the physical machines that the virtual machines are running on. A framework is provided for developing and implementing policies whereby computational loads are distributed in a beneficial manner. Examples of policies include policies that improve loads based on environmental and security concerns.

3 Claims, 6 Drawing Sheets

(56) References Cited

U.S. PATENT DOCUMENTS

| | | |
|---|---|---|
| 2008/0228726 A1 | 9/2008 | Huang et al. |
| 2009/0293022 A1 | 11/2009 | Fries |
| 2009/0307703 A1 | 12/2009 | Archer et al. |
| 2009/0319650 A1* | 12/2009 | Collins et al. ............... 709/223 |
| 2010/0138530 A1* | 6/2010 | Brillhart et al. ............. 709/224 |
| 2010/0217454 A1* | 8/2010 | Spiers et al. ................. 700/300 |
| 2010/0325626 A1* | 12/2010 | Greschler et al. ............ 717/176 |
| 2012/0017012 A1* | 1/2012 | Bartholomay et al. ........ 710/51 |
| 2013/0031294 A1* | 1/2013 | Feng et al. ..................... 711/6 |

OTHER PUBLICATIONS

Qinghui Tang, et al., "Energy-Efficient Thermal-Aware Task Scheduling for Homogeneous High-Performance Computing Data Centers: A Cyber-Physical Approach", IEEE Transactions on Parallel and Distributed Systems, vol. 19, No. 11; Nov. 2008; 15 pages.

Raritan® dcTrack™ Features and Benefits, 5 pages, Nov. 2010.

* cited by examiner

FIG. 1

SYSTEM AND METHOD FOR ASSIGNMENT OF VIRTUAL MACHINES BASED ON PHYSICAL INFORMATION

CROSS-REFERENCE TO RELATED APPLICATIONS

This application claims priority to U.S. Provisional Application No. 61/428,315, filed Dec. 30, 2010, the subject matter of which is hereby incorporated by reference in its entirety.

BACKGROUND

Virtualization in the data center decouples the application being run on a server from the actual server. Typically, virtualization management tools provide visibility of the application being run on a particular logical server via an IP address. This is demonstrated by a screenshot 10 from the industry leading virtualization software vendor VMWare seen in FIG. 1.

The left hand side of the screen shown in FIG. 1 lists hosts by IP address and the applications running on those hosts. This view is a logical view. It is an incomplete view because it does not show the physical view of the hosts and applications.

A view that supplements the logical view is shown in FIG. 2.

The view in FIG. 2 shows two virtual hosts 12 within a rack 14. The numbers within the boxes 16 shown on the virtual hosts 12 represent the number of virtual machines that are residing on that host. By clicking on the box or referring to the location tree, the details of the virtual hosts can be determined. This physical virtualization view enables better informed decisions about virtual machine placement to be made.

Typically, there is a load balancing function within virtualization management tools. Functional clusters of hosts are formed as a framework for load balancing decisions. This allows workload to be evenly distributed among functional hosts. This function does not extend to physical balancing.

An example of a logically unbalanced cluster is shown in FIG. 3. In this figure, each rectangle 18 within a cluster 20 represents a physical server (or host) in that cluster. Each virtual machine 22 within a physical server 20 runs one or more apps 24 on an operating system (OS) 26.

The same clusters as in FIG. 3 are shown in FIG. 4 as logically balanced. All virtual machines 22 (assumed to be of equal workload) are now, in FIG. 4, evenly spread across all virtual hosts 18 of the same function (for example, finance, marketing, and engineering).

FIG. 5 shows a hypothetical physical view 30 of a logically balanced workload. The hosts 18 are shown within cabinets 32. Since the virtual hosts of common cluster functions are interspersed within physical cabinets 32, the result is considered to be, according to one policy, a physically unbalanced load. For example, the physically unbalanced load shown in FIG. 5 may result in a less efficient use of physical infrastructure resources than a physically balanced load would. It requires more cold air to cool a physically unbalanced load, as shown in FIG. 5, than to cool a physically balanced load in which all virtual machines 22 are assigned to hosts 18 that are as close as possible to the bottom of the rack. Also, if three-phase power is being used, power distribution is inefficient when not balanced across three phases.

Without a view of the system that indicates the physical locations of the devices upon which virtual machines are running, there is no way to know if this logical balancing, as shown in FIGS. 4 and 5, has had a negative effect on physical balancing. There is a need for a virtualization visualization and distribution system that takes into account physical aspects of the hosts upon which virtual machines are running.

BRIEF DESCRIPTION OF THE DRAWINGS

Figure 1:
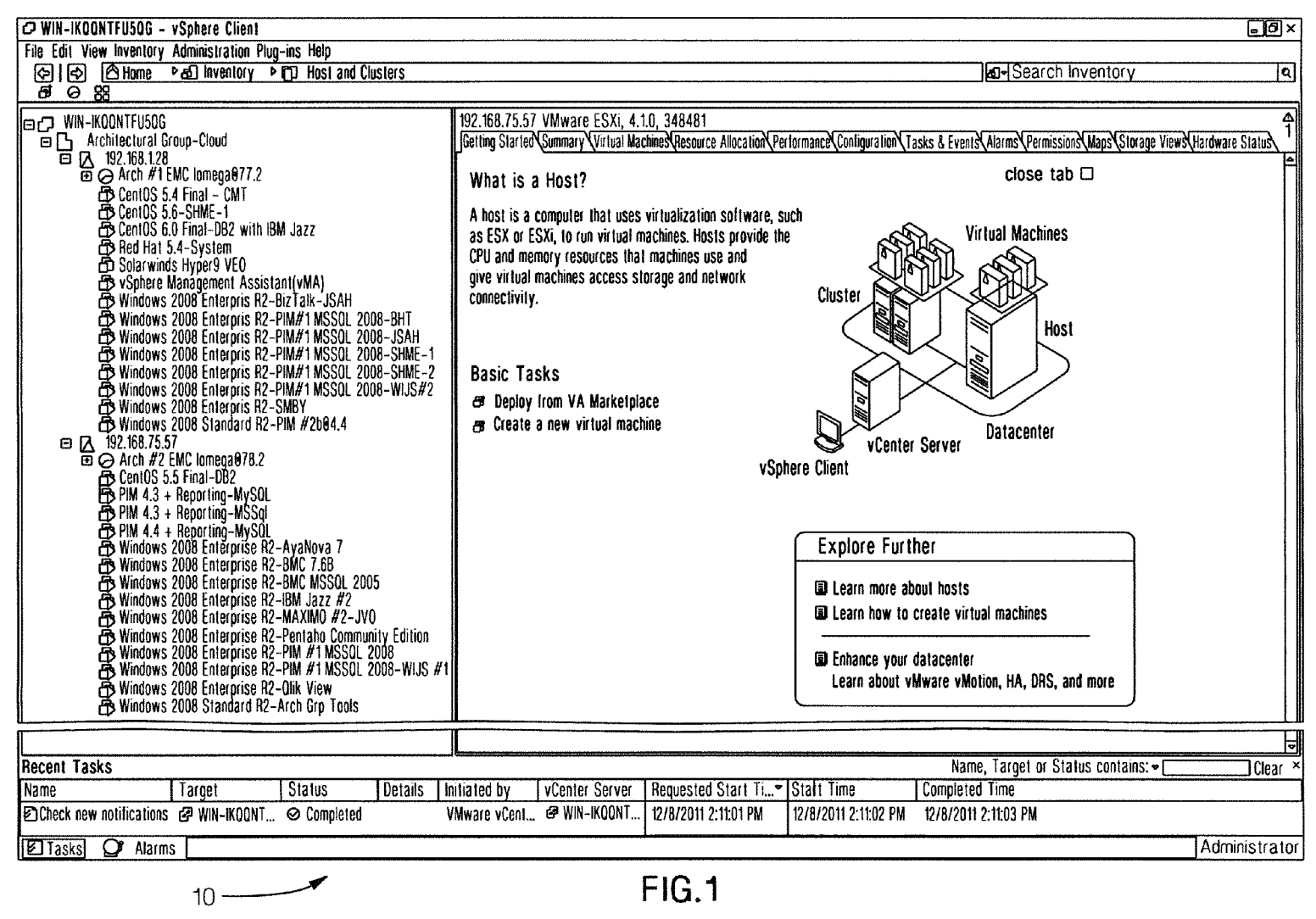

FIG. 1 shows a screenshot of a virtualization management tool showing an application being run on a particular logical server via an IP address.

DESCRIPTION

With the physical view enabled by an asset tracking function, physical clusters can be defined as cabinets 32. If the loads are balanced by physical cabinet clusters, a balanced physical load enables efficient use of physical infrastructure support.

Figure 2:
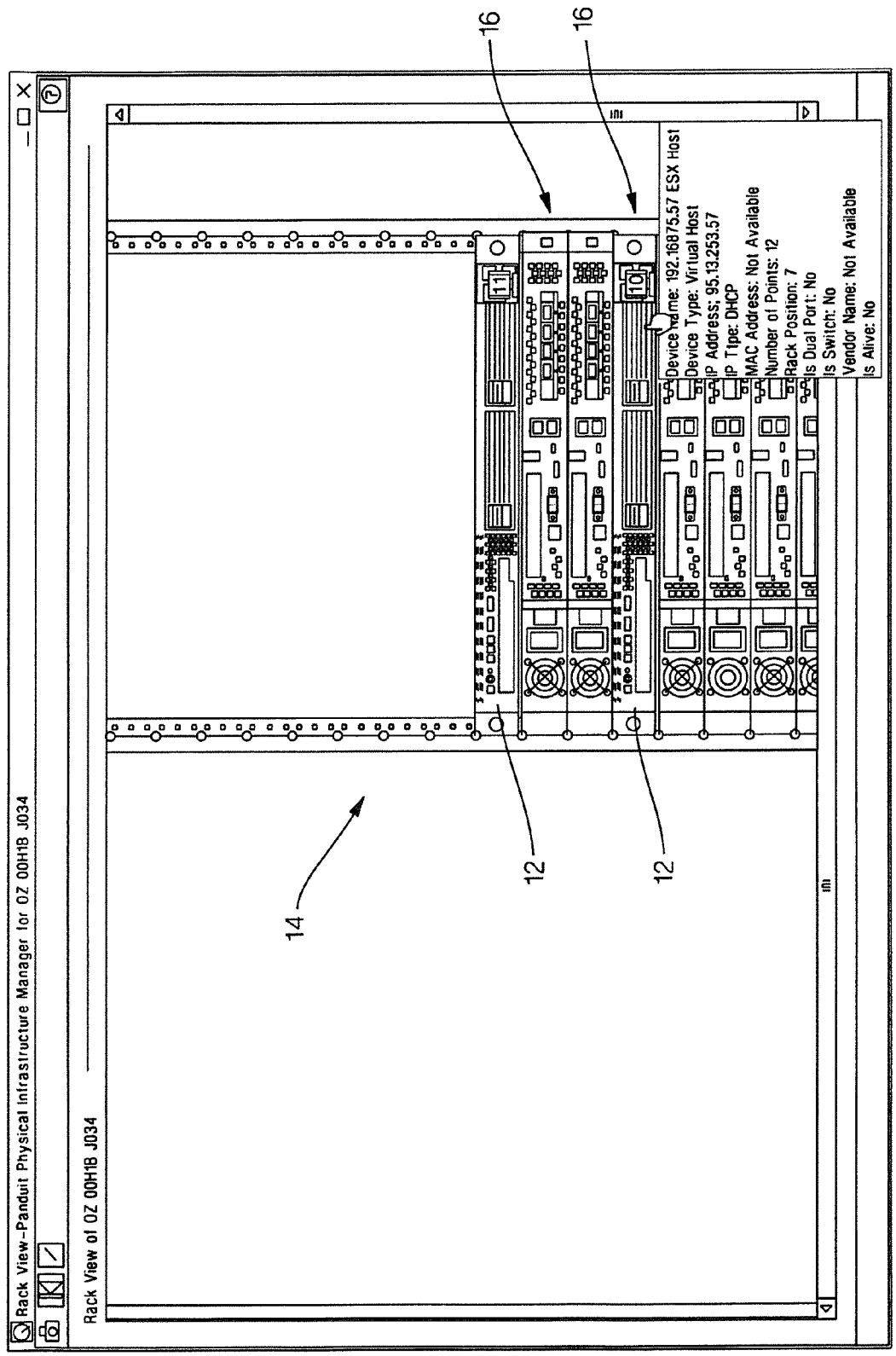
FIG. 2 shows a screenshot of a virtualization management tool showing two virtual hosts.
Figure 3:
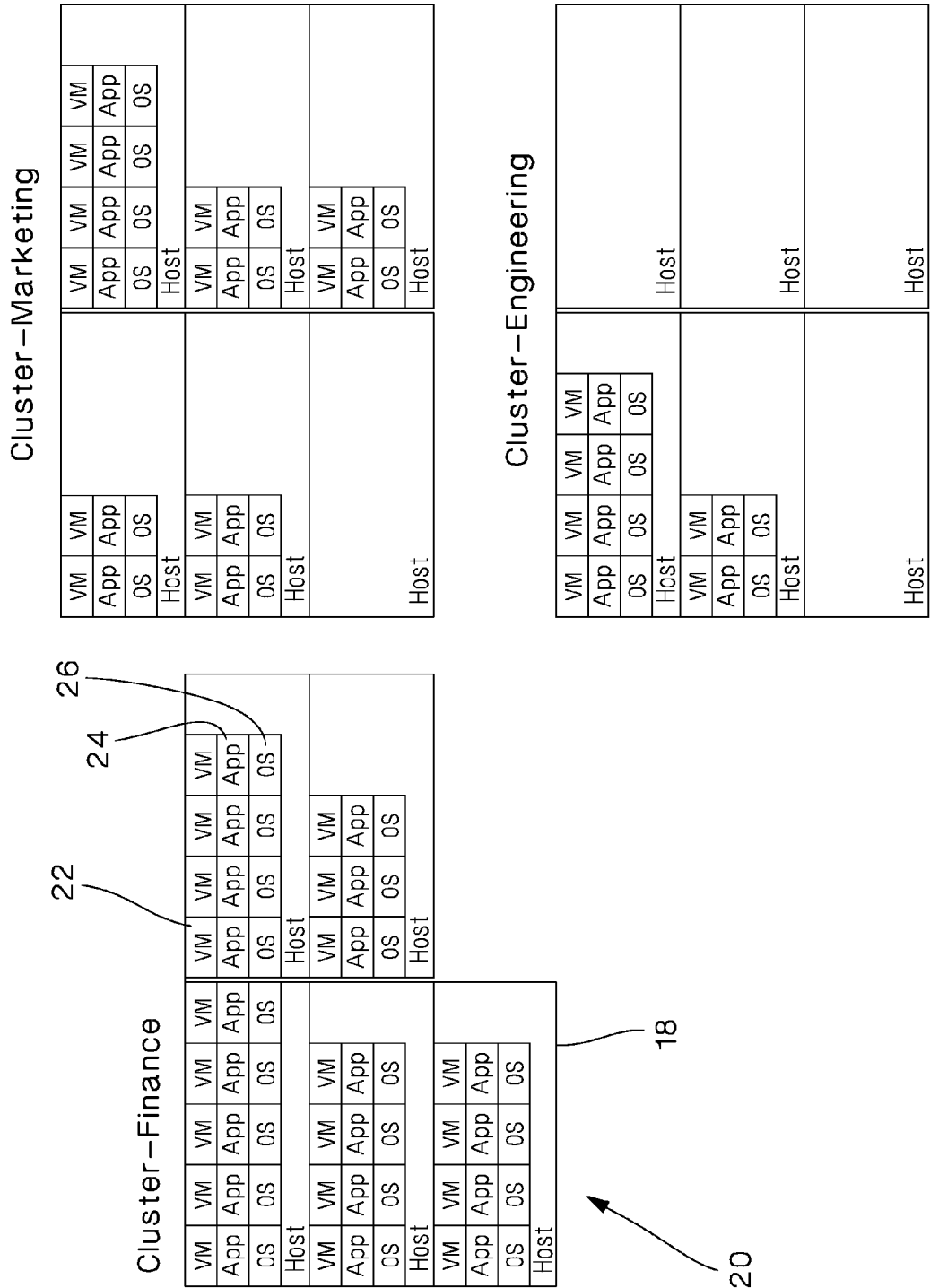
FIG. 3 shows an example of a logically unbalanced cluster of hosts.
Figure 4:
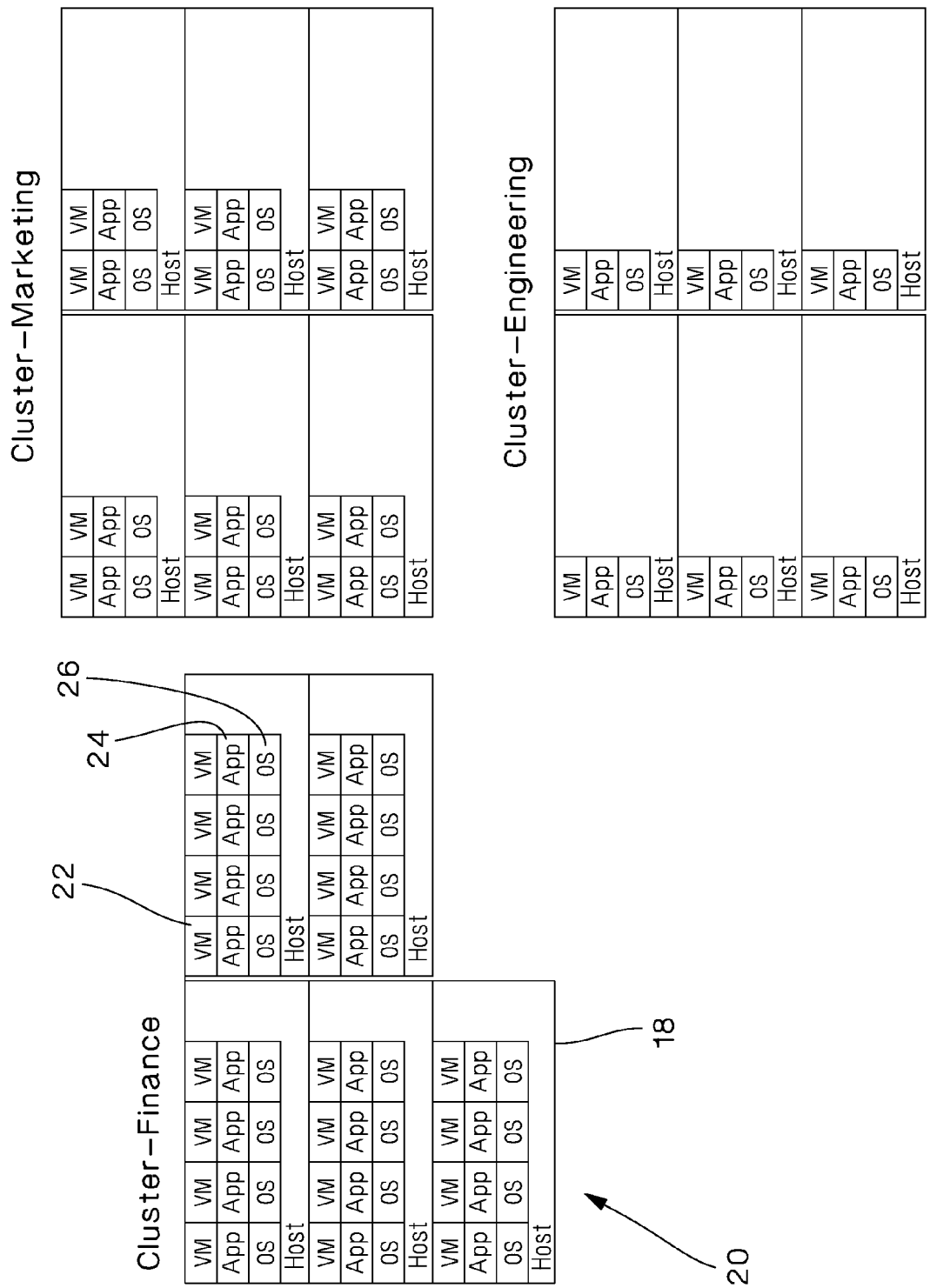
FIG. 4 shows an example of a logically balanced cluster of hosts.
Figure 5:
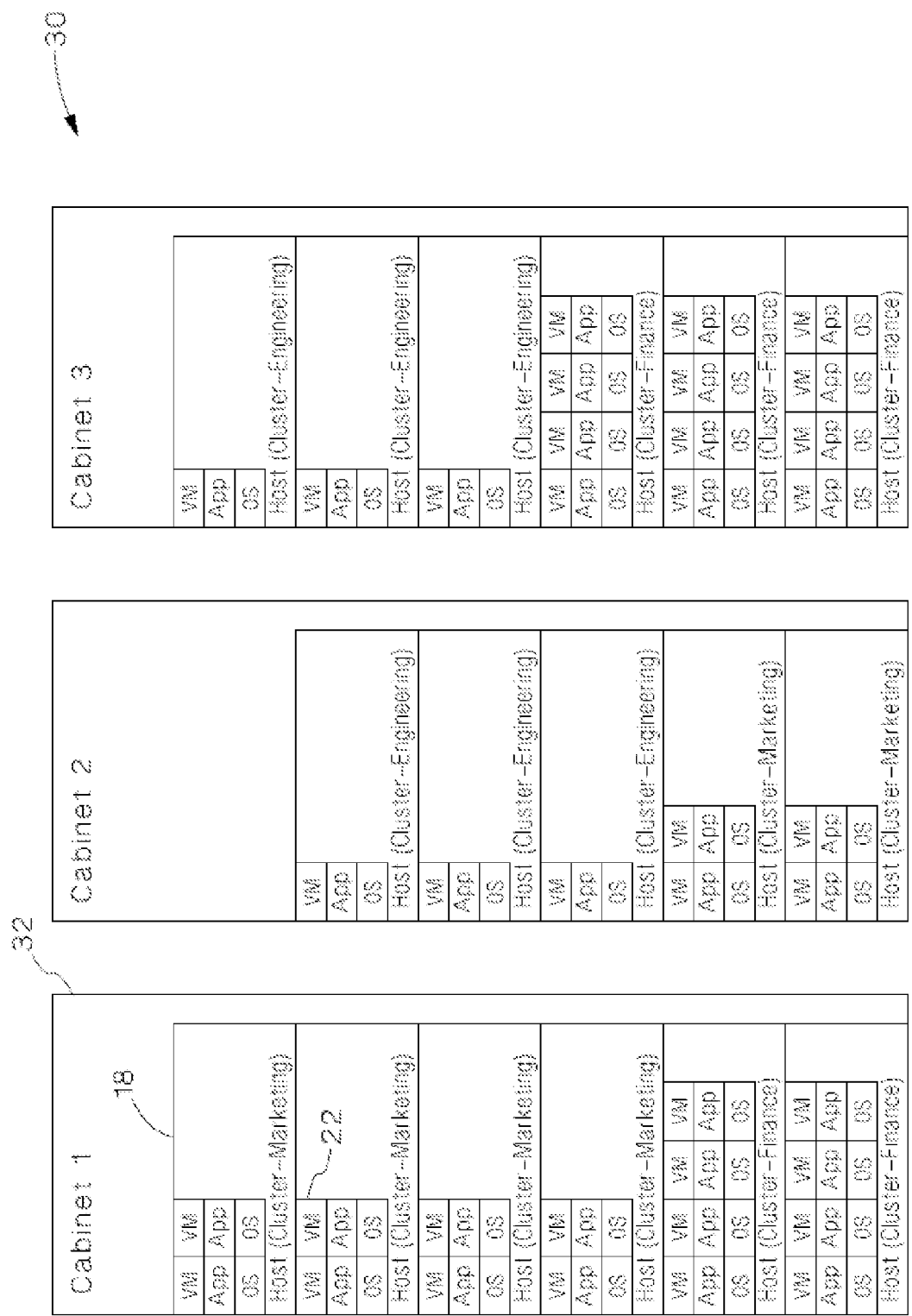
FIG. 5 shows a hypothetical physical view of a logically balanced workload.
Figure 6:
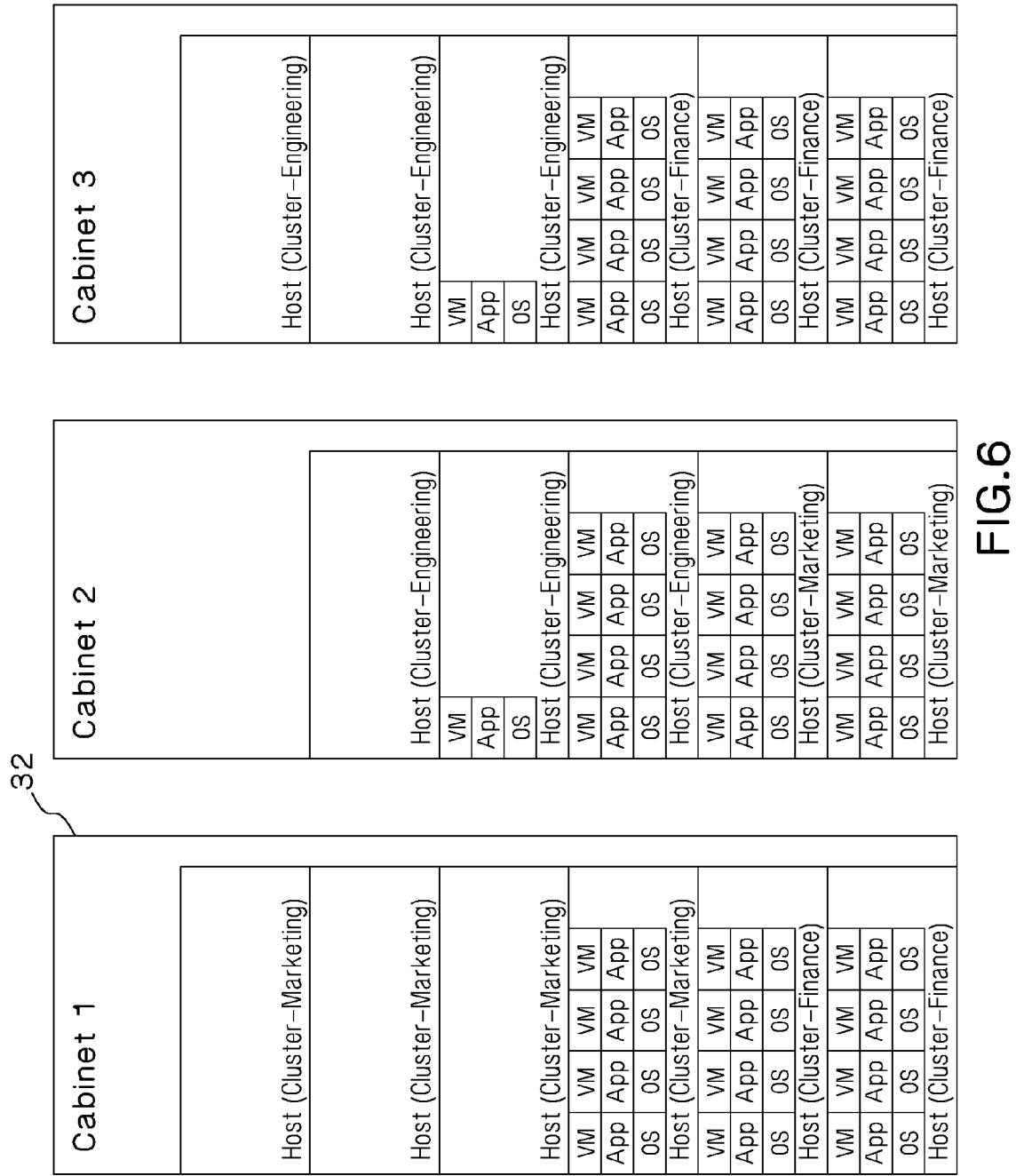
FIG. 6 shows a hypothetical physical view of the workload of FIG. 5 rebalanced in accordance with one embodiment of the present invention.

FIG. 6 shows the same logical load as shown previously, but rebalanced for physical cabinet clusters defined by an exemplary physical infrastructure management system such as Panduit Corp.'s Physical Infrastructure Management system.

The virtual machine workload shown in FIG. 6 is balanced for optimal physical infrastructure usage according to one policy for optimization. In this policy, the loads are evenly distributed between cabinets 32 and concentrated at the bottom of the cabinet which is where cold air is supplied. This workload distribution was accomplished without violating the functional cluster definition.

In other embodiments of the present invention, other policies may be applied to the distribution of loads within physical cabinets. Further, policies may be stacked, such that a first (or primary) policy is satisfied first, and second (or secondary) and subsequent policies are satisfied only after, and in accordance with, the satisfaction of the first policy. For example, a first policy could be to distribute loads so that racks are populated with computational loads from the bottom up, and a second policy could be to distribute loads such that racks that are closer to a cooling unit are populated with virtual machines before racks that are farther from the cooling unit.

The example above demonstrates how a physical view of virtual machines and virtual hosts can supplement the typical logical view provided by virtualization management tools. Also, defining physical clusters based on virtual host locations within cabinets and data center enables increased efficiency regarding physical infrastructure usage.

The structure described above, which is based on an asset tracking system that knows where hosts are physically located and what hosts virtual machines are running on, provides a framework in which policies can be written. The policies can be related to security or energy management. For example, without taking into account the physical aspects of hosts' deployment, virtual machines could all be placed within a certain cabinet or row within a data center resulting in a small physical area that requires a large amount of cooling. By setting a policy to redistribute workloads based on balancing within a physical cluster, the cooling supply can be more efficiently delivered in a distributed manner. Security-based policies may also be executed and enabled by this system. Since the visibility provided by logical clusters does not include physical views, highly secure or sensitive virtual machines could be running on hardware that is in insecure physical areas. A policy could be written to force workloads of a certain sensitivity to be run only in a physically secure environment made up of identified cabinets or data centers.

The invention claimed is:

1. A method for distributing computational loads of virtual machines across a plurality of physical hosts housed within a plurality of cabinets, the method comprising the steps of:

providing an asset tracker, said asset tracker tracking a physical location of each of said plurality of physical hosts, said asset tracker further tracking a physical security status of each of said plurality of cabinets;

determining a physical security requirement of each of said computational loads of said virtual machines; and distributing said computational loads of said virtual machines across said physical hosts according to a first policy that relies on said respective physical location of said physical hosts, according to a second policy that relies on said respective physical security status of said respective cabinets that house said physical hosts, and according to a third policy that relies on said respective physical security requirement of said computational loads of said virtual machines.

2. The method of claim 1, wherein said first policy comprises instructions for populating said respective physical hosts in an ascending manner starting at a bottom of said respective cabinets.

3. The method of claim 2, wherein said first policy further comprises instructions for populating said respective physical hosts based on an ascending proximity to a cooling unit.

* * * * *